United States Patent [19]

Nijenhuis

[11] Patent Number: 5,358,065
[45] Date of Patent: Oct. 25, 1994

[54] WHEELED VEHICLE

[75] Inventor: Derk Nijenhuis, Hoogeveen, Netherlands

[73] Assignee: N.C.H. Hydraulische Systemen B.V., Hoogeveen, Netherlands

[21] Appl. No.: 39,181

[22] PCT Filed: Oct. 11, 1991

[86] PCT No.: PCT/NL91/00198
§ 371 Date: Jun. 1, 1993
§ 102(e) Date: Jun. 1, 1993

[87] PCT Pub. No.: WO92/06882
PCT Pub. Date: Apr. 30, 1992

[30] Foreign Application Priority Data

Nov. 10, 1990 [NL] Netherlands ............ 9002216
Oct. 5, 1991 [NL] Netherlands ............ 9100809

[51] Int. Cl.[5] ............ B60D 7/00; B60P 1/02; B62D 61/12
[52] U.S. Cl. ............ 180/209; 180/12; 280/475; 414/474
[58] Field of Search ............ 180/209, 12, 15; 280/475, 43.23; 414/474

[56] References Cited

U.S. PATENT DOCUMENTS

| 2,651,379 | 9/1953 | Elliott et al. | 180/12 |
| 3,563,329 | 2/1971 | Licari | 180/209 |
| 3,854,542 | 12/1974 | Jesswein et al. | 180/12 |
| 4,136,909 | 1/1979 | Duttarer | 298/17 B |
| 4,460,064 | 7/1984 | Lutz et al. | 180/209 |

FOREIGN PATENT DOCUMENTS

| 419482 | 2/1937 | Belgium . |
| 2535668 | 5/1984 | France . |
| 60615 | 1/1948 | Netherlands . |
| 8500562 | 2/1985 | PCT Int'l Appl. . |

Primary Examiner—Mitchell J. Hill
Attorney, Agent, or Firm—Bachman & LaPointe

[57] ABSTRACT

A vehicle is provided with a number of retractable supporting wheels. When this vehicle is coupled to a load, the supporting wheels can be lifted off the ground so that a very easily controllable assembly is produced. Through the correct selection of the position of the center of gravity, the wheel pressure on the drive wheels is as great as possible. Due to the fact that the supporting wheels can be raised independently, coupling with a load is facilitated.

9 Claims, 4 Drawing Sheets

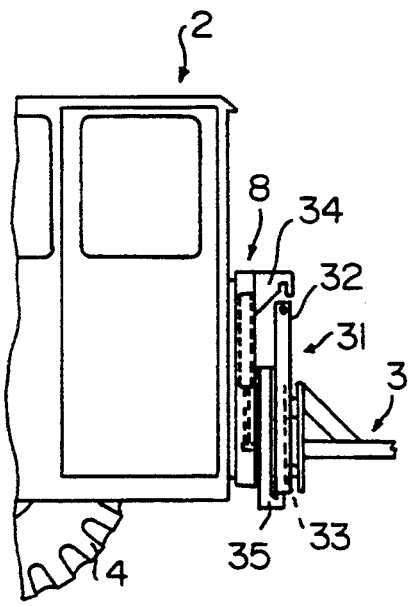
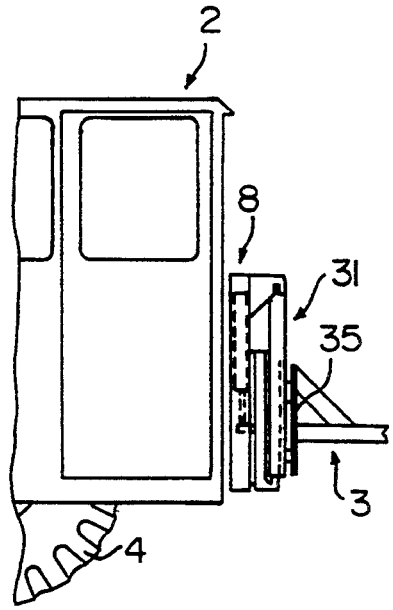
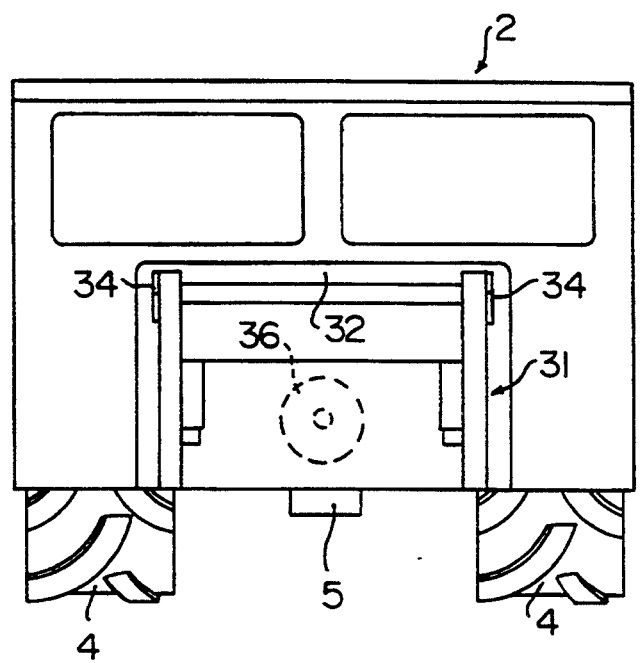

WHEELED VEHICLE

BACKGROUND OF THE INVENTION

The present invention relates to a wheeled vehicle, comprising one or more drive wheels situated relatively close to the longitudinal axis of the vehicle, at least two liftable supporting wheels situated at a relatively greater distance from the longitudinal axis of the vehicle, and coupling wheels for connecting the vehicle to a load resting on the ground and to be moved by said vehicle, the drive means being direction-controllable, the wheels being fitted in such a way that when one or more supporting wheels are raised from the ground the vehicle is out of balance, and the coupling means being designed in such a way that with coupled load the vehicle with supporting wheels raised from the ground is in balance.

Such a vehicle is known from BE-A-419,482. This describes a vehicle having at the front side thereof two mechanically driven drive wheels and at he rear side thereof two supporting wheels which can be raised Jointly from the ground. The drive wheels are situated directly on either side of a vertical shaft about which they can be swivelled. The liftable supporting wheels are situated considerably further apart, on either side of the longitudinal axis of the vehicle. When the vehicle is connected to a load resting on the ground, the liftable wheels can be lifted off the ground without the combination of vehicle with load as a whole being out of balance. Such a combination is particularly easily direction-controllable, in particular when the load is a single axle. In addition, the vehicle, which is relatively expensive due to the propulsion and control means fitted therein, can be used for moving many kinds of loads. This means that this vehicle can be used as efficiently as possible.

The disadvantage is, however, that the making of a connection between the known vehicle and a load is laborious and time-consuming. This is due, inter alia, to the fact that the connection to be made between vehicle and load is a completely rigid connection which is used to ensure that vehicle and load as a whole are in balance when the supporting wheels of the vehicle are raised from the ground. There is also the disadvantage that, particularly when a light load is attached, the drive wheels often have insufficient grip on the ground and often spin.

The object of the invention is to provide a more efficient vehicle of the above-mentioned type which does not have the above-mentioned disadvantages.

SUMMARY OF THE INVENTION

To this end, such a vehicle is characterised in that the supporting wheels can be raised separately.

In this way it is possible to set the position of the vehicle accurately relative to the load and to adapt it to that of the load to be coupled, as a result of which the coupling can be achieved more easily and more quickly, irrespective of the circumstances.

It is also preferable that, viewed in the longitudinal direction of the vehicle, the centre of gravity thereof should be situated above the supporting point of the drive wheels on the ground or at the side thereof facing away from the coupling means. In this way the wheel pressure of the drive wheels will be as great as possible, so that the vehicle can achieve a relatively great pulling force, despite a relatively low weight. According to a preferred embodiment, the drive wheels are in this case on the rear side of the vehicle. As compact a vehicle as possible can be achieved in this way, while the manoeuvrability of the vehicle with load connected thereto is as great as possible.

For good manoeuvrability it is preferable for the drive wheels to be swivellable through at least 180° about a vertical axis. In order to simplify the drive system, it is also preferable to drive the drive wheels hydraulically. The hydraulic drive can also be used for, for example, raising the supporting wheels and operating the coupling means. It is also possible to fix the liftable wheels to the chassis, while the drive wheels resting on the ground lift the entire chassis.

The coupling means of the vehicle can advantageously be provided with a forklift system. This means that the separate vehicle can be used as a forklift truck, while the forklift system can also be used for coupling to a load, as will emerge from the description of the figures. Coupling can also be achieved effectively by means of hook elements, as will also emerge from the description of the figures. In addition to a completely rigid connection to the load, the coupling means can also be designed in such a way that a roll movement can be made between vehicle and load. The coupling can also be designed in such a way that vehicle and load can swivel relative to each other about an axis which is essentially perpendicular to the ground.

In addition, the serviceability of the drive device can be increased even further if it is controllable at both sides as regards travelling, stopping and steering.

BRIEF DESCRIPTION OF THE DRAWINGS

The invention will be explained in greater detail below with reference to a number of examples of embodiments, as shown in the appended drawings, in which:

FIG. 3a and FIG. 3b show a detail in side view of a vehicle according to the present invention;

FIG. 4 shows a rear view of the drive device of the vehicle shown in FIG. 3.

DETAILED DESCRIPTION

Figure 1:
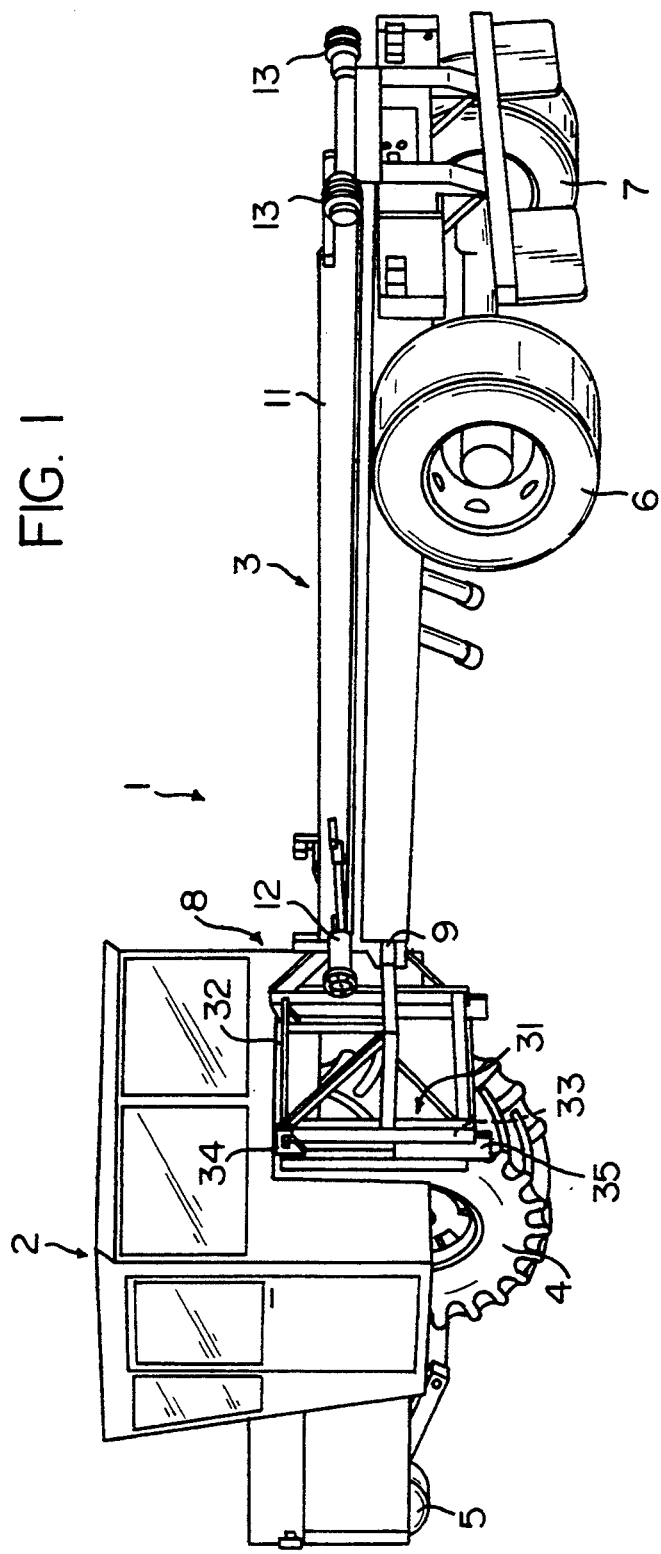
FIG. 1 shows a perspective view of a first embodiment of the vehicle according to the present invention.

The vehicle 1 shown in FIG. 1 comprises a drive device 2 and a mobile load 3 resting on the ground. The drive device 2 rests with a wheel 4 placed on the rear side on the central longitudinal axis of the drive device 2. Two wheels 5, which are raised from the ground, are also provided on the front side of the drive device 2, which wheels 5 are situated against each other on either side of the central longitudinal axis of the drive device 2. This means that in the situation shown the drive device 2 would be out of balance, and the position taken up by the drive device 2 can be maintained only through the drive device 2 being connected by means of a coupling 8 to the load 3. For this, the load 3 rests on the ground with two wheels 6, 7 which are situated opposite each other at the rear side of the load 3, on either side of the longitudinal axis of the vehicle 1. The coupling 8 between the drive device 2 and the load 3 is also designed in such a way that the drive device 2 and the load 3 mutually can make only a swivel movement about the vertical hinge line of hinge 9. Rolling or pitching movements of the drive device 2 are not permitted by the coupling 8. Moreover, the load 3 shown is suitable for loading and unloading in the usual way of, for example, a loading container, for which purpose the bearing frame 11 thereof is provided with cable winches 12 and guide pulleys 13.

Figure 2:
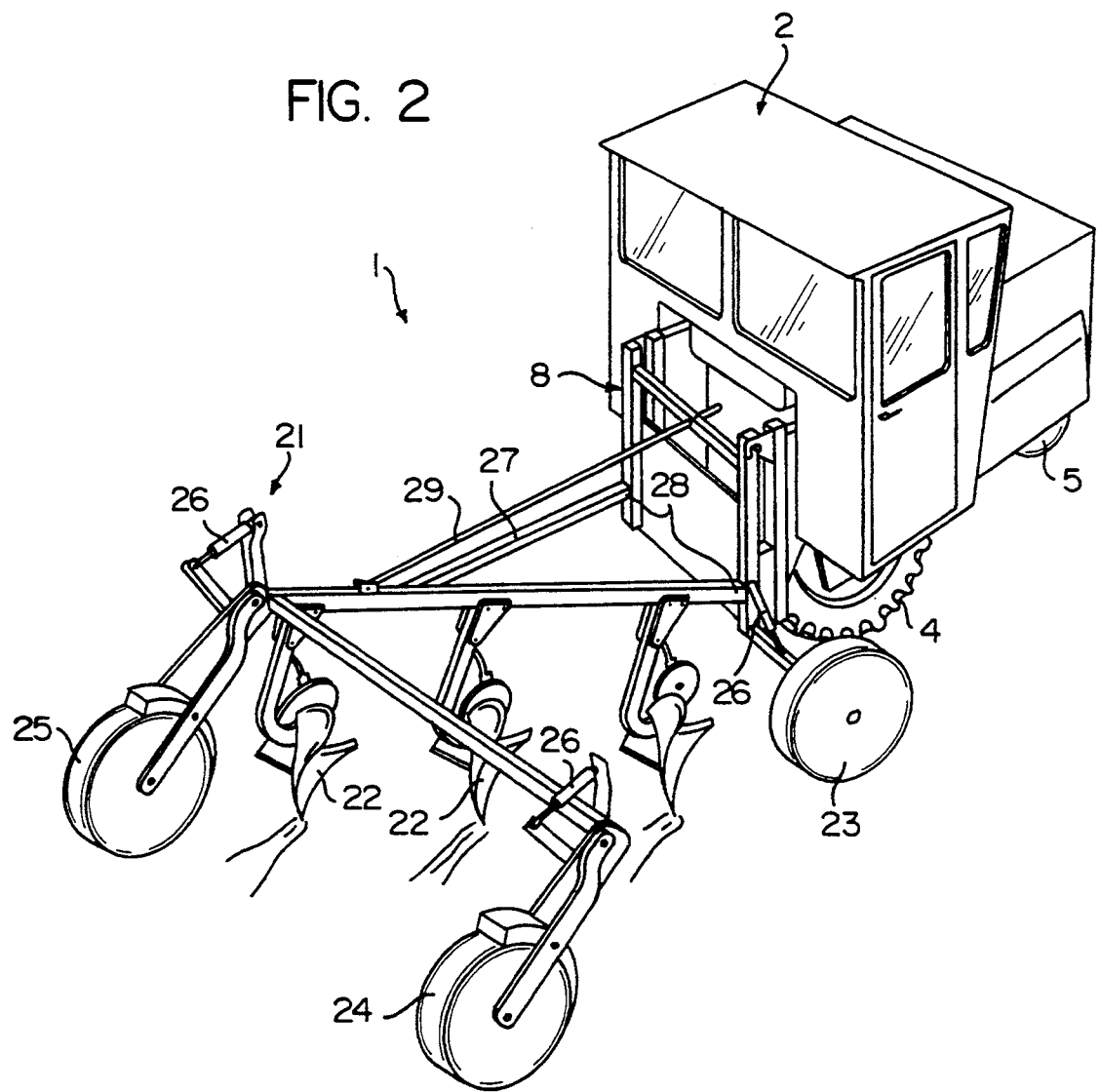
FIG. 2 shows a perspective view of a second embodiment of the device according to the present invention.

FIG. 2 shows a second embodiment of the vehicle 1 according to the present invention. For this, a plough 21 is fixed by means of the coupling 8 behind the drive device 2. The drive device 2 in this case has a configuration like that shown in FIG. 1. Here again the front wheels 5 thereof are raised off the ground. The plough 21 with ploughshares 22 is provided with wheels 23, 24 situated after one another on the same side of the longitudinal axis of the vehicle 1, and a wheel 25 situated opposite wheel 24 on the other side of the longitudinal axis of the vehicle 1. These wheels 23, 24, 25 are liftable by means of hydraulic jacks 26, so that the ploughing depth can be adjusted, but also one or more wheels can be raised from the ground. During ploughing, when the vehicle 1 is travelling essentially straight ahead, the wheel 24 is raised off the ground, while the wheel 23, which is travelling in the plough furrow of the last plough run, is lowered so far that the drive device 2 is horizontal. This is a considerable improvement over the normal position of a conventional tractor during ploughing, where the latter slopes relative to the horizontal due to the fact that one of the rear wheels is travelling in the lower-lying furrow of the previous ploughing run. This means that in the usual tractor the operator assumes a forced leaning position which is bad for his health. When the vehicle 1 from FIG. 2 has to negotiate a sharp bend, the wheel 23 is lifted from the ground, after which the wheel 24 is lowered onto the ground. In order to be able to set the ploughing depth, the plough frame 27 is hinged to the coupling 8 at hinge points 28, while the position of the frame 27 is fixed by a rod 29 to be fixed to the coupling 8, so that the vehicle 1 shown in FIG. 2 is as a whole in balance.

FIGS. 3a and 3b show in greater detail the working of the coupling 8, which is preferably used for fixing the drive device 2 to the load 3 in an easily detachable manner. FIG. 3a shows the coupling 8 in a partially uncoupled position, and FIG. 3b shows the coupling 8 in the completely coupled position. A rectangular frame 31 is fixed to the load 3, which frame is also visible in FIGS. 1 and 2, and in Fig. 1 is also provided with corresponding reference numbers, with on the top side thereof a bar 32 projecting from the frame 31. On the bottom side of the frame 31 are two chambers 33 which are fitted on either side of the longitudinal axis of the vehicle and are open towards the bottom. The bar 32 and the chambers 33 thus form two supporting edges on the load 3 which are at a distance from each other. The drive device 2 has two top hooks 34 and two bottom hooks 35, the latter being movable up and down. As can be seen in FIG. 3a, the bottom hooks 35 engage in the chambers 33. Moving the bottom hook 35 upwards relative to the drive device 2 produces the situation shown in FIG. 3b, in which the top hooks 34 grip round the parts of the bar 32 projecting beyond the frame 31. The coupling between the drive device 2 and the load 3 is thus a fact. In the embodiment shown the frame 31 is connected the load 3 by means of rotary discs 36, which differs from the situation of FIGS. 1 and 2. These rotary discs 36 permit the frame 31 to rotate relative to the load 3 about an axis parallel to the longitudinal axis of said load. In this way drive device 2 and load 3 can carry out a rolling movement relative to each other. Of course, such a design of the coupling 8 with rotary discs 36 is admissible only if the drive device 2 is resting on two wheels on either side of the longitudinal axis thereof.

FIG. 4 shows a rear view of the detail shown in FIG. 3b, with on the rear side of the drive device 2 two wheels 4 placed opposite each other on either side of the longitudinal axis of the drive device 2 and resting on the ground, while a wheel 5 placed on the front side of the drive device 2 centrally on the longitudinal axis thereof is raised off the ground. The load 3 is largely omitted in FIG. 4, but it can still be seen that the frame 31 is connected by means of rotary discs 36 to the load 3.

Figure 5:
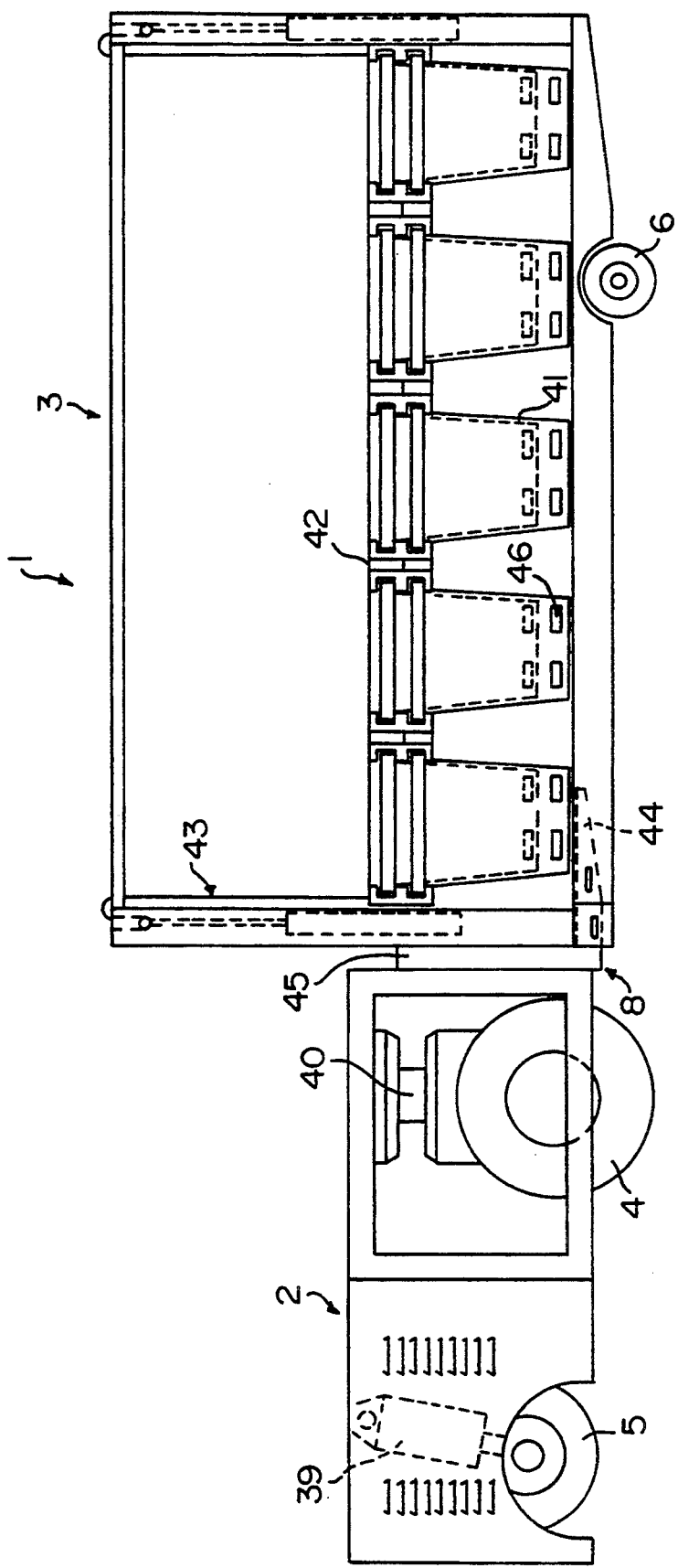
FIG. 5 shows a schematic side view of another embodiment of the vehicle according to the invention.

Finally, FIG. 5 shows yet another variant of the vehicle 1 according to the present invention. This vehicle 1 is described in more detail in Dutch Patent Application 9,002,216 (not a prior publication), also of applicants. The drive device 2 of the vehicle 1 also rests with one wheel 4 on the rear side, positioned centrally on the longitudinal axis thereof, on the ground, while on the front side thereof the two wheels 5 lying opposite each other on either side of the longitudinal axis are raised off the ground. The two wheels 6 are to this end liftable by means of a hydraulic cylinder 39. The load 3 rests on the rear side with wheels 6, 7 on the ground, and is capable of holding refuse containers 41. In the situation shown, two refuse containers 41 are nested in each case, and the top series thereof is held with the top edges in a frame 42, which can be raised by schematically shown lifting means 43 into the top of the load 3. The coupling 8 between the drive device 2 and the load 3 is in this situation essentially formed by a forklift system. For this purpose on each used separately. The fork arms 44 on the top side thereof can also have projections for gripping behind an edge of the load 3, so that the load 3 on forward movement of the vehicle 1 cannot slide off the fork arms 44. Besides, after uncoupling of the drive device 2 and the load 3 the drive device 2 with the forklift system 8 can be used for lifting the containers 41 in and out of the load. For this, sockets 18 are provided in the containers 41 for receiving the teeth 44 of the forklift system. Due to the fact that the wheel 4 of the drive device 2 resting on the flange can be propelled by rotation about the vertical shaft 40, the vehicle 1 is very manoeuvrable. If the drive device 2 shown is not equipped with a cab and has control means on both sides for travelling, racing and swivelling of the wheel 4, operating personnel can operate the vehicle 1 while walking alongside it.

Of course, other embodiments and possible applications of the vehicle 1 according to the present invention are also feasible. Applications in which the speed of travel of such a vehicle need not be high are mainly suitable in this case. For example, instead of one central wheel 4 as shown in FIG. 1, it is also possible to use two wheels fitted close together with coaxial axes of rotation. A double hydraulic drive can be placed between them, with optionally parallel or serial coupling, so that a doubling of traction force or speed can be achieved. Such a pair of wheels can also be rotatable as a whole through 180° about a common vertical shaft. Since many different types of loads can be coupled to the drive device 2, it is possible to put a far-reaching standardised product on the market, which is beneficial for the cost thereof. For the users the investment will consequently remain low.

Although the invention is described mainly with reference to the examples of embodiments shown in the figures, it will be clear that the invention is not intended to be restricted thereto, and is rather determined by the scope of the appended claims.

I claim:

1. A wheeled vehicle, comprising: a vehicle body having a longitudinal axis; support means for supporting said vehicle body in a balanced manner on ground, said support means consisting essentially of (1) at least one drive wheel mounted to said vehicle body so that said drive wheel is direction controllable and (2) at least two supporting wheels liftably associated with said vehicle body and being selectively movable between a lowered position wherein said at least two supporting wheels contact ground and a lifted position wherein said at least two supporting wheels are raised from the ground; and coupling means for selectively connecting the vehicle to a load wherein said at least one drive wheel is positioned longitudinally between the coupling means and said at least two supporting wheels such that said vehicle is balanced when said at least two supporting wheels are in said lowered position and out of balance when said at least two supporting wheels are in said lifted position.

2. A vehicle according to claim 1, wherein said at least two supporting wheels are individually liftable.

3. A vehicle according to claim 1, wherein said at least one drive wheel is hydraulically driven.

4. A vehicle according to claim 1, wherein said coupling means comprises a forklift system.

5. A vehicle according to claim 4, further comprising a load having means for receiving said forklift system whereby said vehicle and said load are coupled.

6. A vehicle according to claim 1, wherein said coupling means comprises at least two vertically spaced sets of hooking elements for grasping said load, at least one set of said hooking elements being moveable so as to grasp said load.

7. A vehicle according to claim 6, further comprising a load having means for coupling with said at least two sets of hooking elements.

8. A vehicle according to claim 1, further including a load connected to said coupling means, said load having at least two wheels resting on the ground whereby said vehicle, remains in balance when said at least two supporting wheels are lifted.

9. A vehicle according to claim 1, further including control means for travelling, stopping and steering said vehicle.

* * * * *